Patented May 21, 1935

2,002,130

UNITED STATES PATENT OFFICE 2,002,130

FLUORANTHENE DYESTUFF AND PROCESS OF MAKING SAME

Robert Sedlmayr and Erich Kruta, Aussig, Czechoslovakia

No Drawing. Application March 7, 1932, Serial No. 597,404. In England March 9, 1931

13 Claims. (Cl. 260—64)

This invention relates to processes for the manufacture of new vat-dyestuffs, and to the dyestuffs obtained thereby.

The process, in accordance with the invention, consists broadly in the production of new vat dyestuffs from fluoranthene, which according to most recent experiments has the empirical molecular formula $C_{16}H_{10}$ and the structural formula

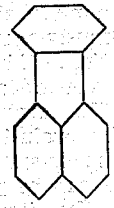

by condensation reactions with anhydrides of the aromatic dicarboxylic acids, such as for example phthalic anhydride, anthraquinone -1.2-dicarboxylic anhydride, naphthalene-2.3-dicarboxylic anhydride. Instead of the acid anhydrides themselves substitution products and homologues may be employed, with the exception of the sulpho slats which do not in general appear to be suitable. The products obtained may themselves be used as or worked up into dyestuffs, or they may be subjected to oxidation, and in some cases the oxidation product may be alkylated. Or the products obtained may be modified by suitable treatment, for example, by the introduction of organic or inorganic groups or radicals as, for example, the halogen, nitro, amino, aroyl-amino groups, etc.

The condensation between fluoranthene and the anhydrides of the aromatic dicarboxylic acids or their homologues and derivatives will take place on simply melting together the constituents in the presence of a condensing agent. As such, aluminium chloride or sodium aluminium chloride is preferably employed. Instead of these, other condensing agents may be employed, such as, for example, antimony chloride, ferric chloride, titanium tetra-chloride, etc. Preferably, however, the condensation is carried out in a solvent for the dyestuff or with the aid of suspension and dispersing agents such as, for example, nitrobenzene and the like.

The following are examples of the manner in which the process may be carried into effect.

Example 1

A mixture of 20.2 parts of technical fluoranthene, 32.5 parts phthalic anhydride, 160 parts aluminium chloride and 30 parts sodium chloride is stirred at 120° C. until the formation of dyestuff is completed. The melt is poured on to ice and then extracted with hydrochloric acid, alkali, lye and water. From the crude product which is thus purified the dyestuff is extracted with trichlorobenezene. It melts at a temperature above 300° C. and is soluble in concentrated sulphuric acid with a blue color. The hydrosulphite vat is colored blue. Cotton from the vat is dyed greenish-yellow after oxidation in the air, and the color is exceptionally fast.

Example 2

20.2 parts of technical fluoranthene and 32.5 parts of phthalic anhydride are dissolved in 300 parts of trichlorobenzene and 45 parts of aluminium chloride are introduced at a temperature of 60° C. When the evolution of hydrochloric acid has ceased, the mixture is slowly heated to 140° C. and is kept at this temperature until the separation of water is completed. The reaction mass is treated with water and the trichlorobenzene removed with steam. The crude dyestuff is boiled with alkali and can be further purified in the manner indicated in Example 1. It is identical with the dyestuff produced in accordance with Example 1.

Example 3

20.2 parts of technical fluoranthene and 39.6 parts naphthalene-2,3-dicarboxylic anhydride are dissolved in 200 grams nitrobenzene and 60 grams of aluminium chloride is added in such a manner that the temperature does not rise above 40° C. The mixture is now slowly heated up to 60° C. and kept at 60° for three hours. The temperature is then increased within a hour to 120° C. and the reaction is allowed to become complete at 120° C. The reaction liquid is now treated with water and the nitrobenzene driven off with steam. The crude dyestuff is extracted with alkali lye and is obtained in a pure form by vatting or extraction with trichlorobenzene. The dyestuff dissolves in concentrated sulphuric acid with a greenish-blue color and vats pure blue. Cotton from the vat is dyed greenish-yellow after oxidation by exposure to air.

Example 4

20.2 parts of technical fluoranthene, 45.4 parts of 4-bromo-phthalic anhydride, 200 parts of nitrobenzene and 60 parts of aluminium chloride are caused to react and worked up in the manner described in Example 3. The 2-bromo-phthaloyl-fluoranthene thus obtained dissolves with a blue color in concentrated sulphuric acid and vats with a reddish-blue color. On oxidation by exposure to air the dyed cotton changes to a more reddish-yellow than the colors produced by the dyestuff formed by the methods of Example 1 or 2.

Example 5

20.2 parts of fluoranthene, 43.4 parts of 4,5-dichlorophthalic anhydride, 200 parts of nitrobenzene and 60 parts of aluminium chloride are caused to react and worked up in the manner described in Example 3. The 2,3-dichloro-phthaloyl-fluoranthene thus obtained dissolves in concentrated sulphuric acid with a blue color and vats a strong reddish-blue. On oxidation by exposure to air the dyed cotton changes to a more reddish yellow than the colors obtained by the dyestuff produced in accordance with Example 4.

Example 6

33.4 parts phthaloyl-fluoranthene produced in accordance with Example 1 are suspended in 300 parts of oil of mirbane and 0.5 parts of iodine are added. 30 parts of sulphuryl chloride are then added by drops within one hour at room temperature and the mixture is then stirred for three hours at a temperature of 60–65° C. The chlorophthaloylfluoranthene formed is washed with nitrobenzene and alcohol. It dissolves with a pure blue color in concentrated acid and vats pure blue with hydrosulphite. Cotton from the vat is dyed greenish-yellow after oxidation.

Example 7

33.4 parts of phthaloylfluoranthene manufactured in accordance with Example 1 are suspended in 300 parts of nitrobenzene and brominated with 32 parts bromine with 0.5 parts iodine as catalyst. The bromine is added by drops within one hour in the cold and the mixture is then slowly heated to 100° C. and kept at this temperature for two hours. The product is worked up as in Example 6. The dyestuff dissolves in concentrated sulphuric acid with a blue color. Its hydrosulphite vat is colored blue. Cotton from the vat is dyed greenish-yellow after oxidation in the air.

Example 8

8.2 parts 2-bromo-phthaloylfluoranthene (manufactured in accordance with Example 4), 5.4 parts alpha-amino-anthraquinone, 0.5 parts cuprous chloride, 3.3 parts melted sodium acetate and 80 parts of nitrobenzene are heated to boiling for three hours and filtered after cooling. After washing with nitro-benzene the dyestuff with the addition of hydrochloric acid is freed from nitrobenzene in a current of steam. The dyestuff dissolves in concentrated sulphuric acid with a greenish-blue color and from a steel blue vat gives a reddish brown color after oxidation in the air.

Example 9

9.8 parts bromo-phthaloylfluoranthene (manufactured in accordance with Example 7), 9.7 parts alpha-aminoanthraquinone, 6.6 parts sodium acetate, 1 part cuprous chloride and 120 parts nitrobenzene are heated to boiling for six hours and worked up in accordance with Example 8. The dyestuff dissolves in concentrated sulphuric acid with a bluish-red color and from a steel blue vat gives colors which turn after oxidation in the air to corinth.

Example 10

9.8 parts bromo-phthaloylfluoranthene (manufactured in accordance with Example 7), 5.2 parts leuco-1,4-diamino-anthraquinone, 6.6 parts sodium acetate, 1 part cuprous chloride and 100 parts oil of mirbane are heated to boiling for six hours and worked up in the usual manner. The dyestuff dissolves in concentrated sulphuric acid with a blue color. Its hydrosulphite vat is colored greenish blue. Cotton from the vat after oxidation in the air is dyed a gray to black shade.

Example 11

10 parts of the dyestuff which is obtained in accordance with Example 9 are melted in 100 parts sodium-aluminium chloride for 1 hour at a temperature of 175–180° C. The melt is poured on to ice and the dyestuff freed from inorganic salts. The pure dyestuff dissolves in concentrated sulphuric acid with a reddish brown color and vats a bluish-violet color. Cotton from the vat is dyed yellowish brown after oxidation in the air.

Example 12

9.5 parts of technical fluoranthene, obtained from coal tar, are dispersed in a solvent, for example, about 150 parts nitrobenzene, together with 15 parts of phthalic anhydride and slowly heated to 110° C. The heating is carried out in the presence of aluminium chloride which may either be added previously or may be added gradually during the heating. If in the course of four hours, heating the conversion temperature of 110° C. is reached, the mixture is kept at this temperature until the evolution of hydrochloric acid is finished which occurs after about three hours. The reaction can be promoted by blowing in air or oxygen. The nitrobenzene is distilled off from the reaction mixture with steam, after acidifying, in known manner, and the residue separated from the acid solution which contains the aluminium chloride, and washed. The washed residue can be treated, for purification with solutions of caustic alkalis, alkali carbonates or by hypochlorites. It can further be purified by solution in concentrated sulphuric acid and fractional reprecipitation by regulated dilution of the solution with water.

The dyestuff obtained in this manner is soluble in concentrated sulphuric acid with a blue-green color, it vats blue-violet and dyes cotton from the hydro-sulphite vat a blue color which on oxidation by exposure to air changes through red to yellow. The colors are of excellent fastness and brilliancy. The product after crystallization once from trichlorbenzene does not melt until 320° C.

The reaction can also be carried out with alkaline condensation agents.

Having thus set forth our invention, we claim:

1. An article of manufacture utilizable as a vat dyestuff essentially comprising a condensation product of fluoranthene with an anhydride of an aromatic ortho dicarboxylic acid.

2. An article of manufacture utilizable as a vat dyestuff essentially comprising a condensation product of an oxidation derivative of fluoranthene containing the fluoranthene nucleus with an anhydride of an aromatic ortho dicarboxylic acid.

3. As an article of manufacture, a condensation product of fluoranthene with phthalic anhydride.

4. As an article of manufacture, a condensation product of fluoranthene with naphthalene-2,3-dicarboxylic anhydride.

5. As an article of manufacture, a condensation product of fluoranthene with anthraquinone-1,2 dicarboxylic anhydride.

6. An article of manufacture utilizable as a vat dyestuff essentially comprising an oxidized condensation product of an aromatic ortho dicarboxylic acid with fluoranthene.

7. An article of manufacture utilizable as a vat dyestuff essentially comprising an alkylated oxidized condensation product of fluoranthene with an anhydride of an aromatic ortho dicarboxylic acid.

8. An article of manufacture utilizable as a vat dyestuff essentially comprising a condensation product of fluoranthene with an anhydride of an aromatic ortho dicarboxylic acid, said condensation product containing a substituent radical selected from the group consisting of halogen, nitro, amino, and aroyl-amino radicals.

9. The process of making compounds utilizable as vat dyestuffs comprising condensing fluoranthene with an anhydride of an aromatic ortho dicarboxylic acid.

10. The process of making compounds utilizable as vat dyestuffs comprising condensing fluoranthene with an anhydride of an aromatic orthodicarboxylic acid while heating the materials together in the presence of a condensing agent.

11. The process of making compounds utilizable as vat dyestuffs comprising condensing fluoranthene with an anhydride of an aromatic orthodicarboxylic acid, while blowing air or oxygen through the reaction mixture.

12. The process of making compounds utilizable as vat dyestuffs comprising condensing fluoranthene with an anhydride of an aromatic orthodicarboxylic acid in the presence of a liquid selected from the group consisting of solvents, suspension and dispersion agents for the dyestuffs.

13. The process of making compounds utilizable as vat dyestuffs comprising condensing fluoranthene with an anhydride of an aromatic orthodicarboxylic acid, and subjecting said condensation product to a further treatment selected from the steps of halogenation, oxidation, nitration, successive nitration and reduction, successive oxidation and alkylation, and introduction of aroyl amino groups.

ROBERT SEDLMAYR.
ERICH KRUTA.

CERTIFICATE OF CORRECTION.

Patent No. 2,002,130.  May 21, 1935.

ROBERT SEDLMAYR, ET AL.

It is hereby certified that error appears in the printed specification of the above numbered patent requiring correction as follows: Page 1, first column, line 25, for "slats" read salts; and second column, line 36, for "a" read an; page 2, second column, line 32, after "hours" strike out the comma; page 3, second column, line 1, claim 10, for the syllable "orth-" read ortho-; and line 12, claim 12, after "liquid" insert the word vehicle; and that the said Letters Patent should be read with these corrections therein that the same may conform to the record of the case in the Patent Office.

Signed and sealed this 17th day of September, A. D. 1935.

(Seal)

Leslie Frazer
Acting Commissioner of Patents.